No. 809,363.  
PATENTED JAN. 9, 1906.

A. O. ENGLUND.  
ROTARY ENGINE.  
APPLICATION FILED MAY 20, 1905.

7 SHEETS—SHEET 1.

Witnesses  
Frank R. Slow  
H. C. Rodgers

Inventor  
A. O. Englund.  
By George L. Thorpe  
Atty.

No. 809,363. PATENTED JAN. 9, 1906.
A. O. ENGLUND.
ROTARY ENGINE.
APPLICATION FILED MAY 20, 1905.
7 SHEETS—SHEET 2.
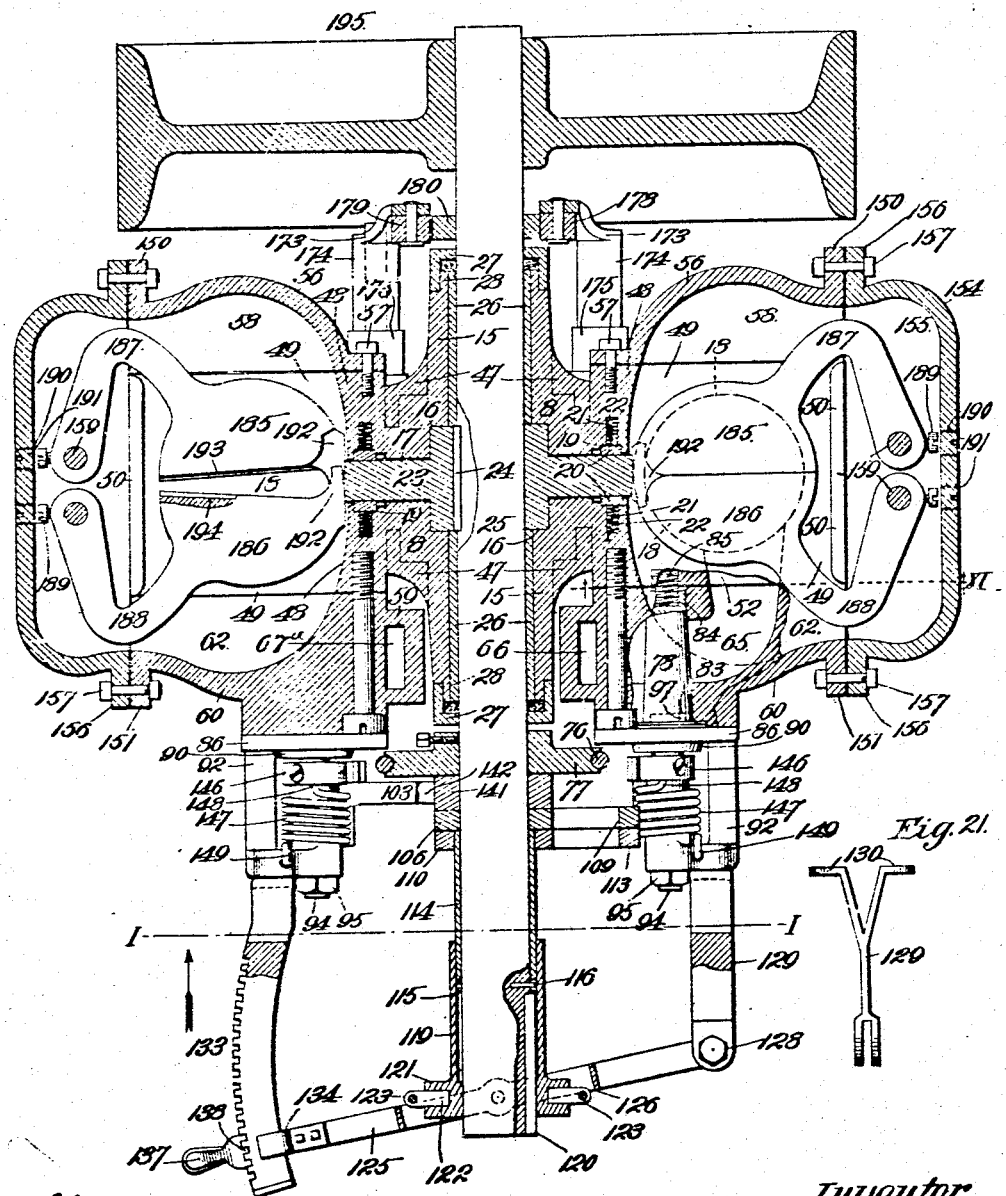

No. 809,363. PATENTED JAN. 9, 1906.
A. O. ENGLUND.
ROTARY ENGINE.
APPLICATION FILED MAY 20, 1905.

7 SHEETS—SHEET 3.

witnesses
Frank R Glow
H.C. Rodgers

Inventor
A.O. Englund
By George J Thorpe
atty.

No. 809,363. PATENTED JAN. 9, 1906.
A. O. ENGLUND.
ROTARY ENGINE.
APPLICATION FILED MAY 20, 1905.

7 SHEETS—SHEET 5.

Witnesses
Frank R. Glow
H. C. Rodgers

Inventor
A. O. Englund
By George J. Torp, Atty.

No. 809,363. PATENTED JAN. 9, 1906.
A. O. ENGLUND.
ROTARY ENGINE.
APPLICATION FILED MAY 20, 1905.
7 SHEETS—SHEET 6.
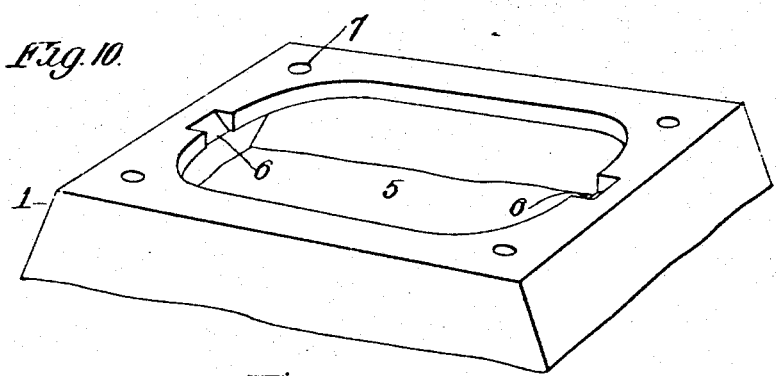
Fig. 10.
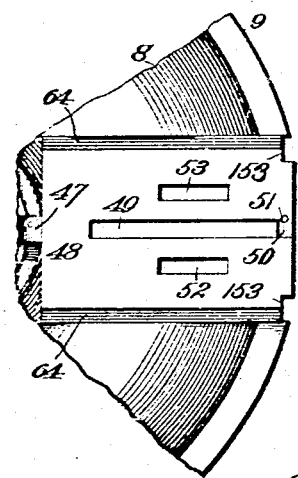
Fig. 11.
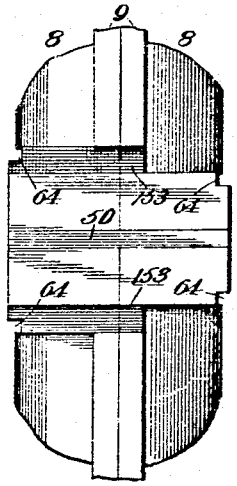
Fig. 19.
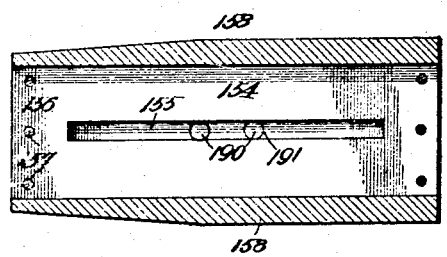
Fig. 12.
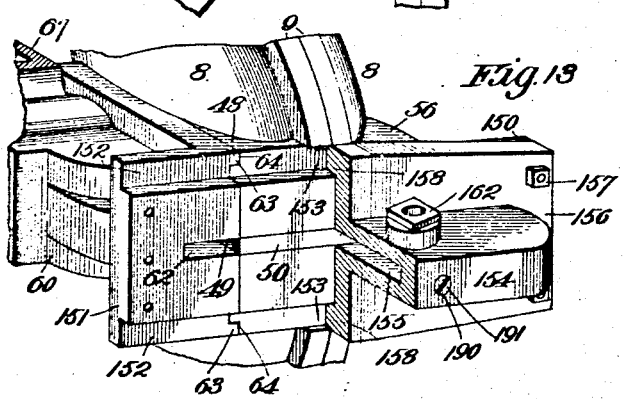
Fig. 13.
Fig. 20.
Witnesses
Frank R. Slow
H. C. Rodgers
Inventor
A. O. Englund
By George T. Thorpe
Atty.

No. 809,363. PATENTED JAN. 9, 1906.
A. O. ENGLUND.
ROTARY ENGINE.
APPLICATION FILED MAY 20, 1905.

7 SHEETS—SHEET 7.

Witnesses
Frank R. Glover
H. C. Rodgers

Inventor
A. O. Englund.
By George J. Thorpe atty.

UNITED STATES PATENT OFFICE.

ALBERT O. ENGLUND, OF WAYNE, KANSAS.

ROTARY ENGINE.

No. 809,363.    Specification of Letters Patent.    Patented Jan. 9, 1906.

Application filed May 20, 1905. Serial No. 261,416.

*To all whom it may concern:*

Be it known that I, ALBERT O. ENGLUND, a citizen of the United States, residing at Wayne, in the county of Republic and State of Kansas, have invented certain new and useful Improvements in Rotary Engines, of which the following is a specification.

My invention relates to rotary engines; and my object is to produce an engine of this character which operates efficiently and reliably and which can be operated entirely under direct pressure or under direct pressure for a part of the revolution and under the expansive action of the steam for the remainder of the revolution of the piston.

With this and other objects in view the invention consists in certain novel and peculiar features of construction and combinations of parts, as hereinafter described and claimed, and in order that it may be fully understood reference is to be had to the accompanying drawings, in which—

Figure 1:
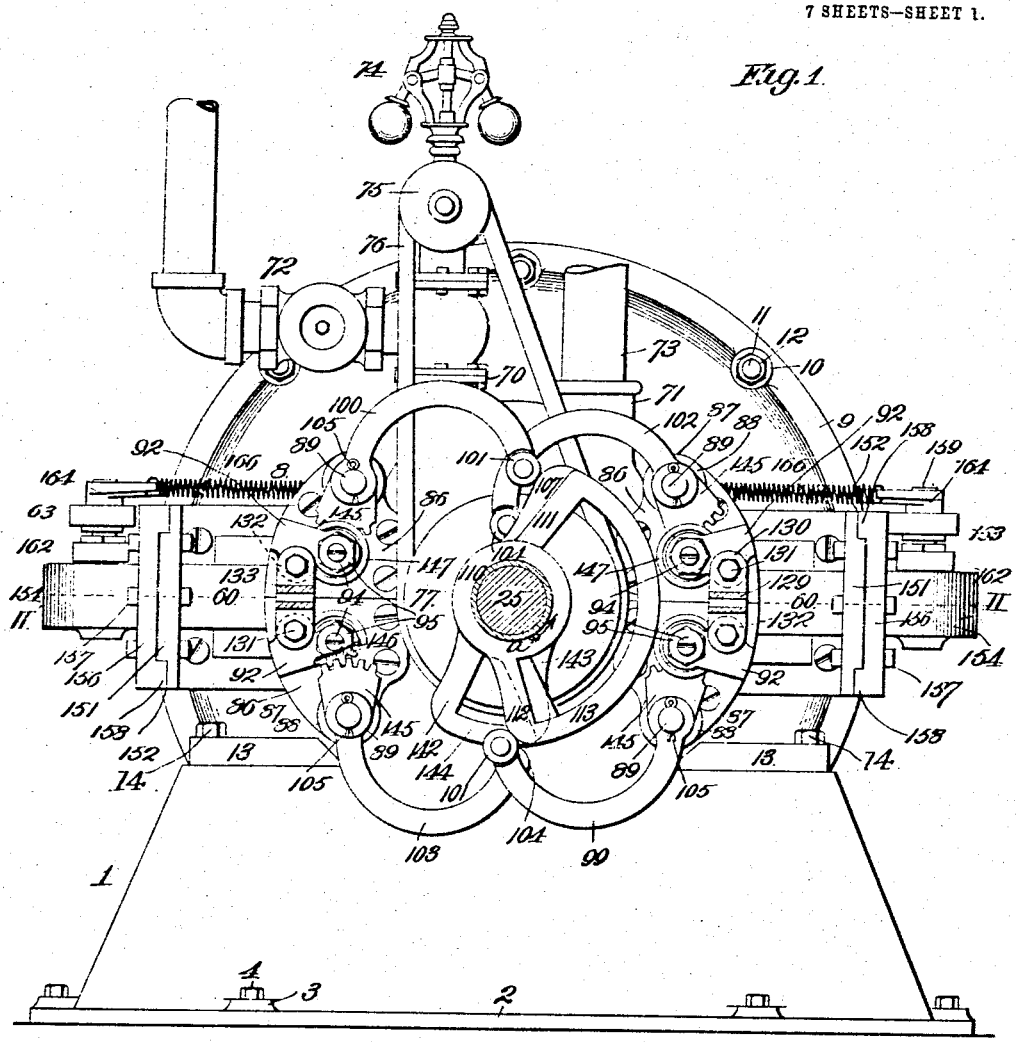
Figure 9:
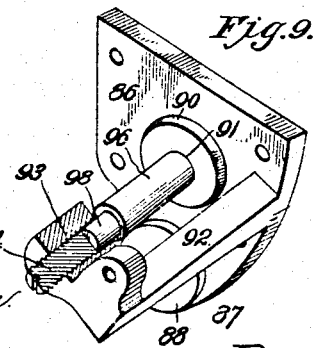
Figure 3:
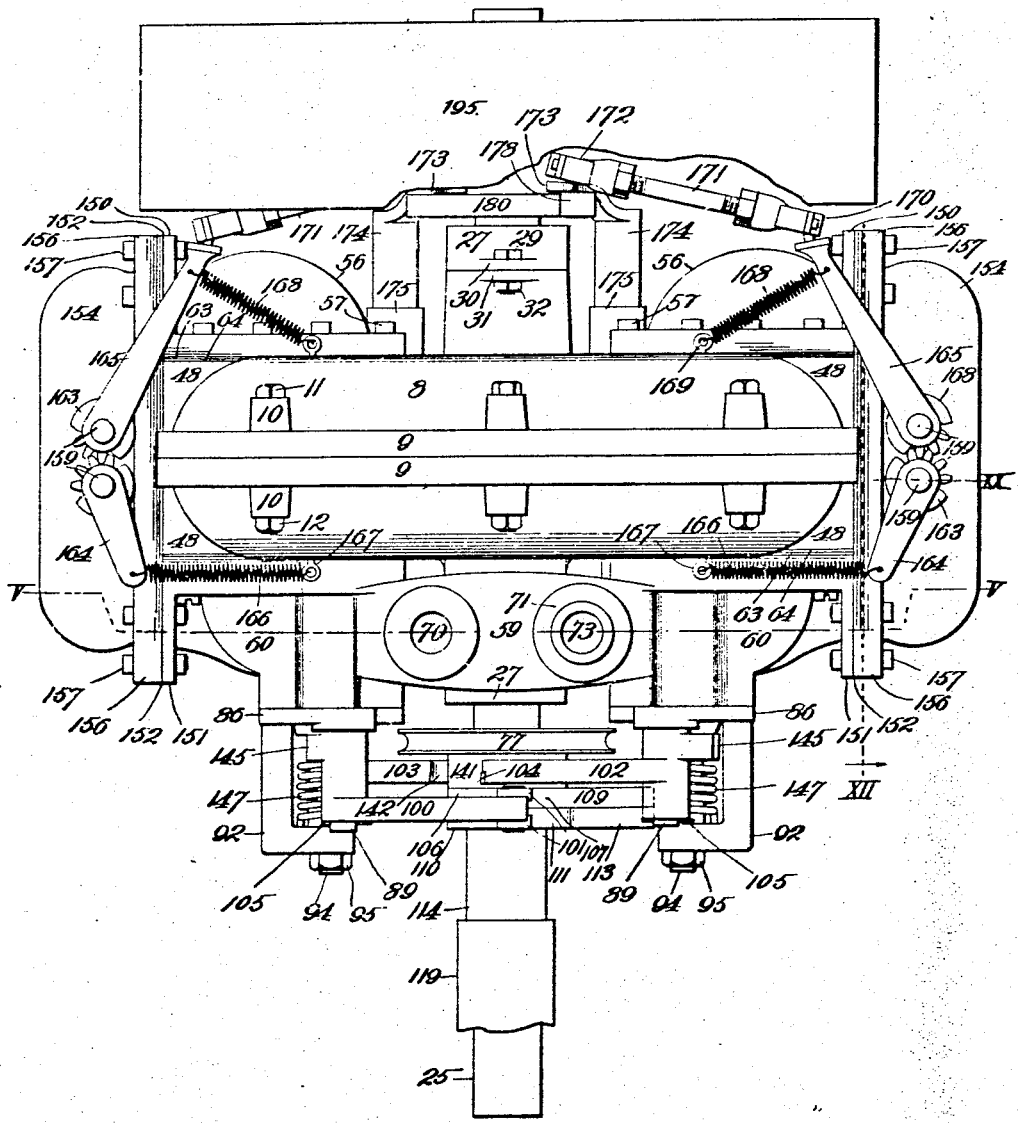
Figure 4:
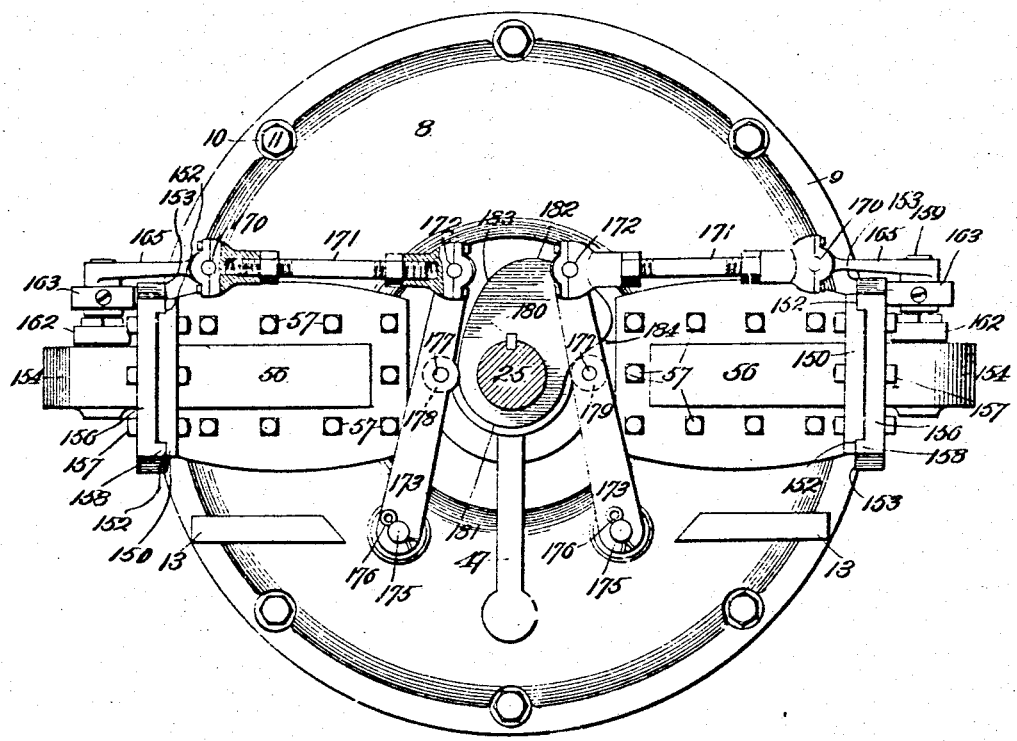
Figure 5:
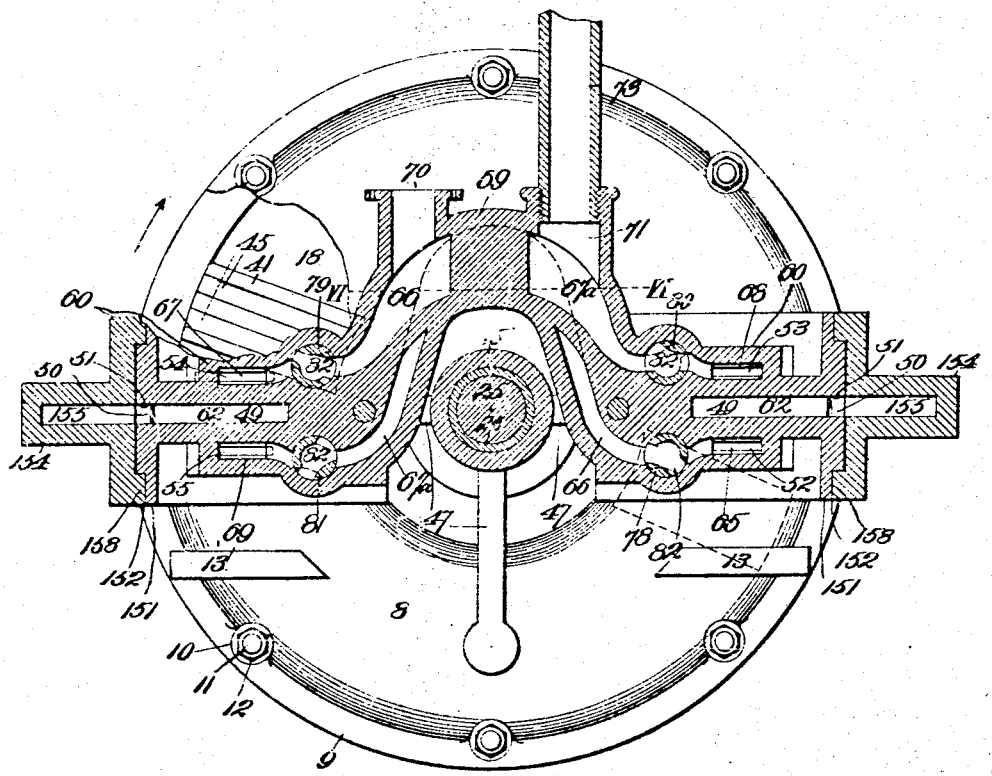
Figure 6:
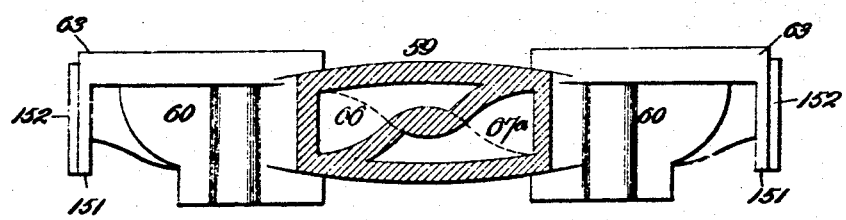
Figure 14:
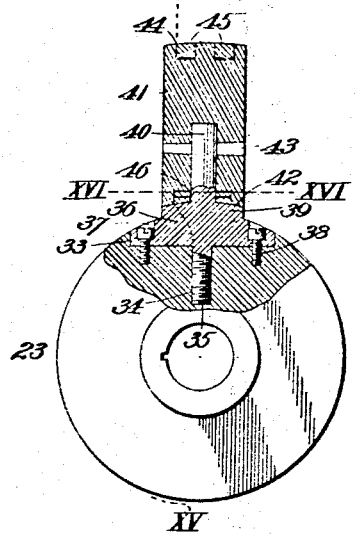
Figure 15:
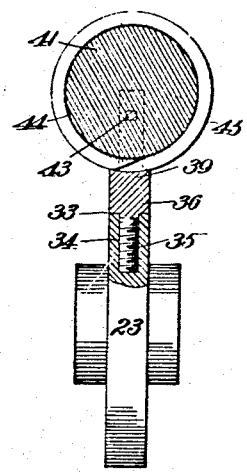
Figure 16:
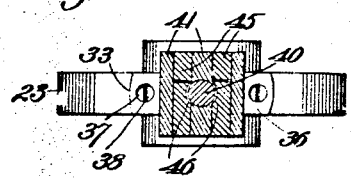
Figure 18:
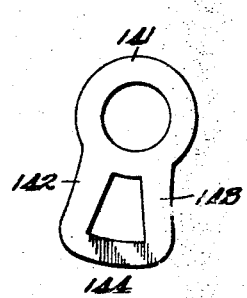
Figure 17:
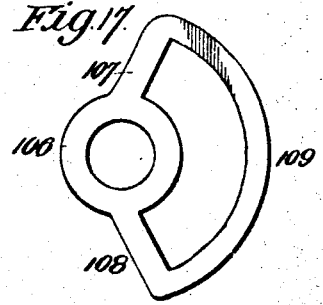

Figure 1 represents a vertical section taken on the line I I of Fig. 2 of a rotary engine embodying my invention. Fig. 2 is a horizontal section on the line II II of Fig. 1. Fig. 3 is a plan view of the engine with the mechanism for shifting the position of the adjustable cam omitted and with the fly-wheel broken away. Fig. 4 is a back view of the engine with the base omitted. Fig. 5 is a vertical section taken on the line V V of Fig. 3 and with the cylinder broken away to disclose the relative positions of the valves and the piston. Fig. 6 is a detail horizontal section taken on the line VI VI of Fig. 5. Fig. 7 is a front view of the shaft and the mechanism for shifting the adjustable cam. Fig. 8 is a detail sectional perspective view of certain elements of the mechanism shown in Fig. 7. Fig. 9 is a detail sectional perspective view of one of the brackets equipped with mechanism to effect the operation of the valves and to provide for adjustment thereof to compensate for wear. Fig. 10 is a detail perspective view, on a reduced scale, of the upper portion of the base. Fig. 11 is a detail sectional view taken on the line XI of Fig. 2. Fig. 12 is a vertical section taken on the dotted line XII of Fig. 3. Fig. 13 is a detail perspective view of a portion of the cylinder and certain parts connected thereto. Fig. 14 is a detail view showing the piston in central vertical section and the disk which carries the same partly in elevation and partly in section. Fig. 15 is a view taken on the line XV XV of Fig. 14. Fig. 16 is a section on the line XVI XVI of Fig. 14. Fig. 17 is a face view of one of the valve-operating cams. Fig. 18 is a face view of another of said cams. Fig. 19 is an edge view of that portion of the cylinder shown in Fig. 11. Fig. 20 is a vertical section taken on the line XX of Fig. 3. Fig. 21 is a side view of the lever-carrying frame.

In the said drawings, 1 indicates a hollow upwardly-tapering boss of oblong rectangular form in plan view and provided with a base-flange 2, having bosses 3, through which bolts 4 extend to secure the base rigidly to any desired support. The top of the base is provided with an elongated opening 5, having its ends rounded. The top is also provided with notches 6, opening into opening 5, and with vertical bolt-holes 7.

The cylinder, which is of circular form, comprises two similar members 8 8, having meeting external flanges 9, bossed outwardly, as at 10, to receive the cross-bolts 11, nuts 12 engaging said bolts to clamp the two members of the cylinder reliably together. The lower portion of the cylinder depends into the base through opening 5, and the flanges 9 extend through the notches 6. The cylinder is also provided with the lugs 13, resting on the top of the base, and bolts 14 extend through said lugs and engage the threaded holes 7 to secure the cylinder and base reliably together. The cylinder is provided with the oppositely-projecting hub portions 15, having their bores enlarged at their inner ends, as at 16, and the inner faces of the hubs are spaced apart so as to provide a chamber 17, which communicates peripherally with the circular piston-chamber formed by the registering grooves 18 in the inner faces of the cylinder members.

19 indicates circular grooves formed concentrically in the inner faces of the hub portions, and fitting in said grooves are friction-rings 20, pressed toward each other by spiral springs 21, occupying recesses 22 in the hub portions.

23 is a disk of substantially the same diameter as and fitting loosely between the inner faces of the hub portions and engaged by friction-rings 20 with a steam-tight relation, the hub of the disk occupying the enlargements 16 of the bore of the cylinder-hub, a key 24 securing said disk rigidly upon the shaft 25, journaled in the bushings 26 of the cylinder-hub.

27 indicates stuffing-boxes fitting on shaft and reduced ends 28 of the cylinder-hub to provide a steam-tight joint between the hub and shaft, and 29 indicates bolts extending through lugs 30 of the stuffing-boxes and 31 of the cylinder-hub, nuts 32 engaging said bolts to make the connection secure.

The disk 23 is provided with the peripheral recess 33, formed by a boring-tool and a radial threaded hole 34, opening into the center of said recess.

35 is a bolt-engaging hole 34 and provided with a head 36 of form to snugly occupy recess 33, said head having countersunk holes 37 to receive the heads of bolt 38, screwed into the disk to prevent accidental turning of the bolt 35, so that the sides of the hub shall lie flush with the sides of the disk. 39 is a peripheral projection of the head of said bolt, and 40 a cylindrical stem projecting outwardly from the head in radial alinement with the bolt and engaging a circular piston 41, snugly partitioning the piston-chamber 18, the inner edge of said piston-head being concaved, as at 42, to fit squarely upon the peripheral projection 39 of the bolt-head. The piston is secured rigidly to stem 40 by a wedge-key 43 or its equivalent and is provided, preferably, with a pair of grooves 44, engaged by substantially circular spring-rings 45, the rings being preferably reduced at their terminals, as at 46, where they lap stem 40, these spring-rings frictionally engaging the wall of the piston-chamber with a yielding pressure, so as to provide a steam-tight joint between the piston and the walls of the piston-chamber. The hollow external portions of the cylinder immediately surrounding the ends of its hubs, as shown most clearly in Fig. 2, is braced by radial strengthening-ribs 47, the horizontal ribs, appearing most clearly in Figs. 2 and 5, being short and merging into horizontally-extending bosses or enlargements 48, formed externally with the cylinder, and said bosses are provided centrally with narrow horizontal gate-passages 49, intersecting the piston-chamber. In practice these horizontal gate-passages are cut clear through the periphery of the cylinder, their outer ends being then closed by steel bars 50, secured in position by keys 51, as shown most clearly in Fig. 11, so that said bars shall practically form parts of the cylinder. The bosses 48 at the rear side of the cylinder, to avoid unnecessary weight, are preferably narrower vertically measured than the front bosses 48, as the latter are provided above and below their gate-passages with horizontal ports, the lower port 52 on the right-hand passage being an inlet-port and the upper port 53 an exhaust-port. The left-hand boss at the front side of the cylinder is provided with similar ports 54 and 55, the upper port 54 being an inlet-port and the lower port 55 an exhaust-port.

56 indicate horizontally-arranged caps bolted, as at 57, to the rear bosses 48 of the cylinder and provided with narrow passages 58, forming lateral continuations of the gate-passages, said passages 58 opening through the outer ends of said caps at opposite sides of the cylinder, as shown most clearly in Fig. 2.

59 indicates an arch connecting and integrally formed with a pair of caps 60, bolted in any suitable manner to the front bosses 48, said arch bridging the front end of the cylinder-hub, as shown most clearly in Figs. 2 and 5. Caps 60 are provided centrally with narrow passages 62 of precisely the same construction as the gate-passage extensions 58 and forming forward extensions of the gate-passages 49, said passages 62, furthermore, opening through the outer ends of caps 60 at opposite sides of the cylinder, as shown clearly in Figs. 2 and 5. To insure perfect rigidity with respect to the cylinders, caps 56 and 60 are provided with inwardly-projecting ribs 63, engaging grooves 64 in the parallel faces of the bosses 48, as shown most clearly in Figs. 13. Caps 60, like the front bosses, are wider, vertically measured, than caps 56 in order to provide space above and below the gate-passages 62 for the steam-ports. The right-hand cap 60 is provided below its gate-passage extension 62 with an inlet-port 65, connected by passage 66 with the upper or inlet port 67 of the left-hand boss. Above the gate-passage extension 62 the right-hand boss is provided with an exhaust-port 68, connected by passage 67ª with the exhaust-port 69 in the left-hand boss, passages 66 and 67ª extending through the arched connection 59 of the caps 60, and where they pass each other in the arch are of greater height than width. Beyond the plane of intersection said passages are so formed as to be of greater width than height. By this arrangement the passage may be of substantially uniform cross-sectional area from one end to the other without causing the arched portion to be of undue width—in other words, without making the arch portion wider or materially wider than the actual width of the ports, as shown most clearly in Figs. 2 and 6.

70 and 71 indicate tubular bosses rising from the upper portion of arch 59 and communicating, respectively, with the inlet-port connecting passage 66, and exhaust-port, connecting passage 67ª. 72 indicates a valve-controlled steam-supply pipe communicating with tubular boss 70, and 73 an exhaust-pipe, communicating with boss 71.

74 is a governor of any suitable or preferred type for controlling automatically in any preferred manner the supply of steam to the engine, the connection not being detailed, because of common and well-known construction.

75 is a pulley, adapted to operate the governor through any suitable mechanism (not shown) and connected by the belt 76 with the belt-wheel 77 on shaft 25.

78 and 79 indicate the valves controlling inlet-ports 65 and 67, respectively, and 80 and 81 indicate similar valves controlling the exhaust-ports 68 and 69, respectively. Each of said valves has a cross-passage 82 of greatest width at the end contiguous to the passages of the arch 59, and each valve is provided with a socket 83 in its front or larger end and with a socket 84 in its rear or smaller end, said socket being engaged by an expansive spring 85, seated in the proximate boss 48, as shown most clearly in Fig. 2, where, it will be observed, the contiguous parts are broken away and the valve 78 is partly sectioned in order to clearly expose the lower inlet-port 65, the valve therefor, and the connected part, just described.

Bolted in any suitable manner to the flattened or front side of each cap 60 are similar brackets, the brackets of each cap being inverted with respect to each other. As the brackets are of identical construction a description of one will suffice for all.

86 indicates the base of the bracket having one end straight and the other rounded, by preference, as at 87, and projecting from the face of the base at the rounded end is a boss 88, and rigidly secured to and projecting from said boss is a cylindrical stud or pin 89. A second boss 90 projects from the face of the base, and extending through said boss and base is a circular passage 91.

92 is an arm projecting forward from the base and having a laterally-projecting head provided with a cylindrical passage 93 in longitudinal alinement with but smaller than passage 91 and having front end threaded for engagement by the set-screw 94, a locknut 95 being mounted on said screw to prevent it working inward or rearward accidentally.

96 is a rock-shaft journaled in passage 91 and provided at its rear end with a cross-rib 97 engaging the groove 83 of the alined valve, the front end of the rock-shaft being diametrically reduced, as at 98, and fitting in the non-threaded end of passage 93, so that when set-screw 94 is advanced it shall force the valve rearward against the resistance of the springs 85, this adjustment of the valve being for the prupose of compensating for wear.

99 and 100 are outwardly-bowed diametrically opposite arms in the same vertical plane and provided at their free ends with a pair of antifriction-rollers 101, said arms being journaled or pivoted at their opposite ends on the lower right-hand stud or pin 89, and the upper left-hand stud or pin 89 of the brackets above described, the pair of brackets secured to each cap having their straight edges 86 fitting together, so as to dispose corresponding parts at equal distance from the center of shaft 25, as shown clearly in Fig. 1. 102 and 103 are similar bowed arms, arranged in the same vertical plane rearward of arms 99 and 100, and each provided at its free end with an antifriction-roller 104. At their opposite ends said arms are pivoted or journaled on the diametrically opposite studs or pins 89. Said arms 99, 100, 102, and 103 are retained upon said studs or pins by means of spring-cotters 105.

A cam rigidly secured on shaft 25 in the vertical plane of the inner or rear antifriction-rollers 101, as shown clearly in Fig. 3, comprises a circular hub 106, arms 107 and 108 converging outwardly from said hub at a slight angle, and the segmental portion 109 connecting the outer ends of said arms and of relatively much greater diameter than the hub. A similar cam, occupying the vertical plane of the front rollers 101 and adapted by adjustment to control the period of time under which the engine operates under direct pressure of the steam, is of substantially the same form and proportion as the first-named cam—that is to say, it comprises a hub 110, outwardly-converging arms 111 112, and the segmental portion 113 connecting the outer ends of said arms. The last-named cam is rigidly mounted upon a sleeve 114, journaled on shaft 25 and prevented from forward movement by the collar 115, secured on the shaft by a pin 116, or otherwise, and said sleeve is provided with one or more outwardly-projecting lugs 117, engaging one or more spiral slots or grooves 118 in the collar 119, which at its rear end fits upon sleeve 114. At its front end the collar is diametrically reduced internally to slidingly engage the longitudinal key 120, secured to the shaft. (See Fig. 2.) Said collar is provided with a peripheral annularly-grooved flange 121 to receive rotatably a ring 122, composed of two semicircular sections having outwardly-projecting ears 123, secured rigidly together, as shown most clearly in Fig. 7, the collar at its upper and lower sides being provided with outwardly-projecting pins 124.

125 indicates a horizontally-disposed lever, provided with a loop 126 at its center of greater internal diameter than flange 121 and provided with holes 127, engaging pins 124 of the ring. At one end the lever is fulcrumed, as at 128, in the bifurcated front end of the frame 129, having upward and downwardly projecting feet 130, secured by bolts 131 to lugs 132, projecting from the heads of the arms 92 of contiguous brackets, hereinbefore described. (See Fig. 9 and dotted lines, Fig. 1.)

133 is a rack-bar having feet bolted or otherwise secured to the lugs 132 of the brackets at the opposite side of the shaft from its carrying-frame 129, said rack-bar being curved concentrically of pivotal point 128 and arranged just above lever 125, a keeper 134, secured to the lever, overlying said rack-bar to maintain the latter and the lever in close relation.

135 is a hollow block depending from the lever and having its chamber registering with a slot 136 in the lever. 137 is a dog having one or more teeth 138 and a lug 139 extending down through the slot of the lever and into the chamber of the plug and pivoted to the latter, as at 139, a spring 140, secured to the lever and bearing against the dog, holding the tooth or teeth of the latter in engagement with the teeth of the rack-bar. When the lever occupies the position shown in Fig. 2, the adjustable cam is disposed, as shown in Fig. 1, with relation to the companion cam—that is to say, arm 111 is projecting to the right of arm 107 and arm 112 to the left of arm 108 of the companion cam. Now if the operator desires to bring the abrupt tread-faces of arms 111 and 112 flush or even with the corresponding faces of arms 107 and 108, respectively, he trips the dog, by pressure thereof, and swings lever 125 forward. This action slides collar 119 forward and through the pin and spiral slot connection rotates sleeve 114 in the direction indicated by the arrow, Fig. 8, which is the opposite direction to that in which the piston travels. Under this adjustment of the adjustable cam the engine may operate entirely under direct pressure. To obtain direct pressure for the entire revolution of the piston, said cams will be disposed as shown in Fig. 1. If it be desired to further diminish the distance which the piston travels under direct pressure and in corresponding measure provide for a proportionately longer travel of the piston under expansive action of the steam, the lever is thrown to the position indicated by the head of the contiguous arrow in Fig. 2, this action revolving the sleeve 114 through the instrumentality of said pin and spiral-slot connection between said sleeve and sliding sleeve 119 in the opposite direction to that indicated by the arrow in Fig. 8, so as to hold the inlet-port valves 78 and 79 closed for the greater portion of a revolution, this being so because both of the cams above referred to act upon arms 99 and 100, and therefore open said valves through instrumentalities hereinafter described.

In vertical alinement with the arms 102 and 103, and mounted rigidly on the shaft, is an exhaust-port cam, the same comprising a hub portion 141, the substantially parallel arms 142 and 143 projecting outwardly from the same side of the hub portion, and the segmental portion 144 connecting the outer ends of said arms. It will be seen that the segmental portion 144 of said cam describes approximately only about one-eighth of a circle, and that as each exhaust-port is closed only while said portion 144 is in engagement with the roller 104, connected to the valve of said port, that the exhaust-ports are never closed at the same time, and when closed remain in that condition for only a very small fraction of the revolution of the piston, as hereinafter and more fully explained. To transmit the motion imparted to arms 99, 100, 102, and 103 by the cams to the valves, each of said arms is provided with a gear-segment 145, meshing with the mutilated or segmental gears 146, rigidly secured on the rock-shafts, springs 147, having their inner ends secured, as at 148, to said mutilated or segmental gears 146 and having their outer ends secured, as at 149, to the heads of the bracket-arms 92, the tendency of said springs being to hold the valves open—that is to say, hold their passages in communication with their respective ports at one side and the passage at the opposite side which passes through the arch 59. The upper right-hand exhaust-port valve 80 is shown in the position described, and it will be likewise noticed that the arm 102, geared to said valve, has its roller 104 engaging the reduced or hub portion 141 of the exhaust-port cam.

150 indicates a vertical flange projecting rearwardly from the outer ends of the caps 56, and 151 similar flanges projecting forwardly from the outer ends of caps 60, the upper and lower ends of said flanges being provided with horizontal grooves 152, extending parallel with the axis of the engine and of precisely the same formation, except that the grooves of the forwardly-projecting flanges are deeper than those of the rearwardly-projecting flanges, because the forwardly-projecting flanges are of greater height than the rearwardly-projecting flanges, it being remembered in this connection that the caps 60, from which the forwardly-projecting flanges project, are preferably wider than the caps 56, because of the fact that the former are provided with ports above and below their gate-passages, and in longitudinal alinement with said grooves are transverse kerfs or grooves 153 in the flanges 9 of the cylinder. It will be noticed in this connection, by reference to Fig. 11, that for the width, vertically measured, of the bosses 48 the flanges 9 are planed off flush with the outer ends of said base.

154 indicates caps in the horizontal plane of and paralleling shaft 25 at opposite sides of the cylinder, the inner sides of said caps being flat and provided with shallow passages 155, closed for the greater portion of their length by bars 50 and opening at opposite sides of the cylinder into and forming part of gate-passage extensions 58 and 62, as shown clearly in Fig. 2, and said caps are provided with end flanges 156, bolted, as at 157, to the flanges 150 and 151 of caps 56 and 60, respectively. Said caps 154 are furthermore provided with inwardly-projecting ribs 158, engaging grooves 152 and the kerfs or grooves 153 to assist the bolts 157 in more reliably securing said caps in position, the upper sides of that portion of ribs 158 projecting rearwardly from flanges 9 being preferably tapered rearwardly, so that their rear ends shall correspond in depth to the shallower grooves 152 of flanges 150. This beveling of the ribs, however, is for appearance sake only and is otherwise unimportant.

159 indicates a pair of rock-shafts extending down through the upper wall of each cap 154 and stepped at their lower ends in sockets 160 in the lower walls, the upper walls having upwardly-projecting externally-threaded flanges 161 surrounding said shafts and engaged by internally-threaded stuffing-boxes 162, surrounding the shafts, to make a steam-tight joint between the same and the cap.

163 indicates mutilated intermeshing gear-wheels mounted on said shafts above the stuffing-boxes, and 164 and 165 are inwardly-diverging crank-arms rigidly secured to the shafts above said mutilated gears, crank-arms 164 being connected by retractile springs 166 to fixed points 167 of the cylinder for a purpose which hereinafter appears. Crank-arms 165 are likewise connected by retractile springs 168 to fixed points 169 of the cylinder and at their rear ends have a universal-joint connection 170 with the outer ends of extensible links 171. The inner ends of links 171 have a universal-joint connection, as at 172, with the upper ends of a pair of upwardly-projecting levers 173, having hub portions 174 pivotally engaging the reduced portions of cylindrical studs 175, projecting from the rear side of the cylinder, the cotters 176 extending through the rear ends of said studs to hold the levers thereon. The levers are provided with rigid forwardly-projecting pins 177, and journaled upon the left-hand one as viewed from the rear of the machine is an antifriction-roller 178 and upon the other one is an antifriction-roller 179. Between said rollers and carried rigidly upon the shaft is a gate-operating cam 180, having a tread-surface 181, describing a distance of about one hundred and eighty degrees, a tread-surface 182, describing a distance of about sixty degrees, a tread-surface 183, connecting the first-named tread-surfaces, and a tread-surface 184, extending approximately radially of the shaft and connecting the opposite ends of tread-surfaces 181 and 182. As shown, roller 178 is engaging one end of tread-surface 181, and roller 179 is engaging the substantially radial tread-surface contiguous to the opposite end of tread-surface 181 and is therefore a slightly-greater distance from the center of the shaft than roller 178 for a purpose hereinafter explained.

A gate in each gate-passage to completely partition the cylinder at times consists of two semicircular flat members 185 and 186, having angle-arms 187 and 188, occupying the gate-passage extensions 58 and 62, respectively, and both occupying the passage 155 of the juxtaposed cap 154, within which said arms are secured rigidly on shafts 159 by set-screws 189, said set-screws being introduced into the cap through the threaded holes 190, closed by screw-plugs 191 in the outer faces of said caps 154. At their inner or free ends the sections 185 and 186 of each gate are provided with extensions 192 of half the thickness of the sections themselves, so that said extensions shall overlap and, in conjunction with the tongues 193 of sections 185 and the grooves 194 of sections 186, lock said sections together, as shown at the right-hand side of Fig. 2, against vertical movement, which would of course be followed by the passage of steam between the members. Secured rigidly on the rear end of the shaft is a fly-wheel 195, which may be utilized as a belt-wheel, or special belt-wheels (not shown) may be employed. This fly-wheel tends to insure uniformity in the speed of the piston, and consequently in the machinery belted or otherwise geared to the engine. As hereinbefore stated, one of the gates is partly opened—that is to say, the members of one of the gates are slightly separated, the cause of such separation being due to the fact that roller 179 is more remote from the center of the shaft than roller 178, it being observed that the lever-carrying roller 179 is connected to operate the rock-shafts of said opened gate.

With the engine at rest and the parts disposed as shown—that is, with the left-hand gate partly opened, all of the valves except exhaust-port valve 80 closed, the various cams and their connections as shown most clearly in Figs. 1 and 4, and the lever 137 as shown in Fig. 2—it will be apparent that to start the engine the operator must grasp lever 137 and pull the same forward slightly. This action results in rotating the adjustable cam backward, as indicated by the arrow a, Fig. 1, a slight distance to permit the spring 147 of valve 78 to slightly open said valve, as shown by dotted lines, Fig. 5. This operation of the adjustable cam takes place without affecting the other inlet-valve 79, as will be readily understood by reference to Fig. 1. Immediately valve 78 is opened steam passes through passage 66, the passage of said valve, the inlet-port 65, and its extension 52 (see Fig. 2) into the piston-chamber below the closed gate, said steam then passing downward to the left and through the partly-opened or left-hand gate and impinges against the rear face of the piston just forward of said opened gate. If the "load" is heavy and direct pressure of the steam is desired for the full revolution of the piston, the lever 137 is left in the position to which it was pulled. Under this action the piston begins to travel in the direction indicated by the arrow, Fig. 5, and immediately after such movement begins valve 79 opens (see dotted lines, Fig. 5) through the action of its respective spring 147, because at such moment the roll 101 of arm 100 of said valve travels inward upon its respective cam. At the same time valve 78 closes through the engagement of its cam with the roll 101 of the valve-arm 99, and then the left-hand gate closes under the retractile action of its springs 166 and 168. Exhaust-port valve 81 at almost the same moment opens under the action of its spring 147, because its cam permits the roll 104 of the arm 103 of said valve to move inward to the hub 110 of the cam, and the right-hand gate opens under the action of its respective cam, and just before the piston reaches the plane of the exhaust-port 68 the valve 80 thereof closes (see dotted lines, Fig. 5) under the action of the controlling-cam. After the piston passes the open right-hand gate and the inlet-port 65 valve 78 of the latter is opened by its spring 147, because the controlling-cam has assumed such position that roll 101 of arm 99 of said valve may move inward on said cam, and the right-hand gate closes under the action of its retractile springs, and valve 79 is also closed through the action of the controlling-cam. The description of the operation thus far covers the movement of the piston from the position shown in full to the position shown in dotted lines, Fig. 5—that is, for one-half of a complete revolution. The remaining half of the revolution takes place under the pressure of the steam entering the piston-chamber between the closed right-hand gate and the piston. To accommodate this latter half of the piston movement, the exhaust-port valve 80 opens under the action of its respective spring 147 and the left-hand gate opens under the action of its cam, and just before the piston reaches the plane of the exhaust-port 69 the valve 81 thereof closes under the action of its respective cam. After the piston passes the open left-hand gate and the inlet-port 67 valve 79 is opened by its respective spring and the valve 78 closes through the action of its controlling-cam and the left-hand gate closes through the action of its controlling-spring. In the first half of the revolution the left-hand gate closes shortly before the right-hand gate opens, and in the second half the right-hand gate closes shortly before the left-hand gate opens, and in this connection it will be observed that each gate closes under the retractile action of the springs 166 and 168 through a head of steam—that is, while steam under pressure is at both sides of the gates. As a result the gate is closed easily, which would not be the case if steam under pressure were imposed on it from one side only, and in this connection it is desired to call attention to the fact that a spring is employed for each gate-section, (see Fig. 3,) so as to insure proper and complete closure of the gate irrespective of any looseness or play in the intermeshing gear-wheels 163, connecting their rock-shafts. It will also be noticed that during the periods of time when the gates are opening there is no live-steam pressure upon them at either side, and consequently they are opened easily by the cam 180. If the load on the engine is not sufficiently heavy to necessitate operation under a direct pressure of steam for its full travel, the operator after the engine has once started by pulling the lever forward, as explained, shoves said lever rearwardly, so as to advance the adjustable cam with respect to its companion inlet-port-valve operating-cam, and thereby hold said inlet-port valves closed for a longer period than they were held closed by said cams, as illustrated, it being understood, of course, that said inlet-port valves are open during the periods of time when rollers 101 are engaged with the tread-surfaces of the hub or reduced portions of said cams, the valves closing as said rollers ride outward on the tread-surfaces of said arms 108 or 112 of said cams and opening as they ride inward upon the tread-surfaces of the arms 107 or 111 of said cams. It will likewise be understood that when rollers 104 are traveling on the tread-surface of the hub or reduced portion 141 of the exhaust-port cam the exhaust-ports are open and that when either of said rollers is traveling outward on the tread-surfaces of arm 142 or inwardly on the tread-surfaces of arm 143 of said cam its respective exhaust-port valve is closing or opening. Should the engine start to operate with the piston at any other point in its travel than the substantially diametrically opposite points indicated by full and dotted lines in Fig. 5, one of the inlet-port valves will always be open to admit steam to the piston-chamber behind the piston, and consequently there will be no necessity for pulling the lever to its forward limit of movement for the purpose of opening one of said valves to admit steam to the piston-chamber, all that is necessary being to open the valve in the steam-supply pipe.

From the above description it will be apparent that I have produced a rotary steam-engine which embodies the features of advantage enumerated as desirable in the statement of the object of the invention and is of exceedingly strong, compact, and durable construction, and while I have illustrated and described its preferred embodiment it will be apparent that it is susceptible of modification in various particulars without departing from the essential spirit and scope or sacrificing any of its advantages.

Having thus described the invention, what I claim as new, and desire to secure by Letters Patent, is—

1. A rotary engine, comprising a cylinder having a circular chamber, a shaft centrally of and surrounded by said chamber, a piston rigid with the shaft and partitioning the chamber, a gate partitioning the chamber, valve-controlled inlet and exhaust ports communicating with the chamber at opposite sides of the gate, means for opening the inlet-port valve to admit steam to the chamber between the piston and said gate, means to close the exhaust-port valve as the piston passes the point of communication of the exhaust-port with the chamber, means for opening the gate to permit the piston to pass, and means to close the inlet-port valve at a predetermined time.

2. A rotary engine, comprising a cylinder having a circular chamber, a shaft centrally of and surrounded by said chamber, a piston rigid with the shaft and partitioning the chamber, a gate partitioning the chamber, valve-controlled inlet and exhaust ports communicating with the chamber at opposite sides of the gate, means for opening the inlet-port valve to admit steam to the chamber between the piston and said gate, means to close the exhaust-port valve as the piston passes the point of communication of the exhaust-port with the chamber, means for opening the gate to permit the piston to pass, means to close the inlet-port valve at a predetermined time, means to reopen the exhaust-port valve after the piston passes its point of communication with the said chamber, and means to reclose the gate after the piston passes it.

3. A rotary engine, comprising a cylinder having a circular chamber, a shaft centrally of and surrounded by said chamber, a piston rigid with the shaft and partitioning the chamber, diametrically opposite gates, valve-controlled inlet-ports communicating with the chamber at diametrically opposite points and at opposite sides of the plane of said gates, and valve-controlled exhaust-ports communicating with the chamber at diametrically opposite points, and at opposite sides of the plane of the gates.

4. A rotary engine, comprising a cylinder having a circular chamber, a shaft centrally of and surrounded by said chamber, a piston rigid with the shaft and partitioning the chamber, diametrically opposite gates, valve-controlled inlet-ports communicating with the chamber at diametrically opposite points and at opposite sides of the plane of said gates, valve-controlled exhaust-ports communicating with the chamber at diametrically opposite points, and at opposite sides of the plane of the gates, means for alternately opening the inlet-port valves, means for closing said valves, means for alternately opening the exhaust-port valves, means for closing said valves, means for alternately opening the gates, and means for closing said gates.

5. A rotary engine, comprising a cylinder having a circular chamber, a shaft centrally of and surrounded by said chamber, a piston rigid with the shaft and partitioning the chamber, diametrically opposite gates, valve-controlled inlet-ports communicating with the chamber at diametrically opposite points and at opposite sides of the plane of said gates, valve-controlled exhaust-ports communicating with the chamber at diametrically opposite points and at opposite sides of the plane of the gates, means for alternately closing the inlet-port valves, springs for opening said valves, means for alternately closing the exhaust-port valves, springs for opening said valves, means for alternately opening the gates, and means for closing said gates.

6. A rotary engine, comprising a cylinder having a circular chamber, a shaft centrally of and surrounded by said chamber, a piston rigid with the shaft and partitioning the chamber, diametrically opposite gates, valve-controlled inlet-ports communicating with the chamber at diametrically opposite points and at opposite sides of the plane of said gates, valve-controlled exhaust-ports communicating with the chamber at diametrically opposite points and at opposite sides of the plane of the gates, piston-actuated means for alternately closing the inlet-port valves, means for opening said valves, piston-actuated means for alternately closing the exhaust-port valves, means for opening said valves, piston-actuated means for opening the gates, and means for closing said gates.

7. A rotary engine, comprising a cylinder having a circular chamber, a shaft centrally of and surrounded by said chamber, a piston rigid with the shaft and partitioning the chamber, diametrically opposite gates, valve-controlled inlet-ports communicating with the chamber at diametrically opposite points and at opposite sides of the plane of said gates, valve-controlled exhaust-ports communicating with the chamber at diametrically opposite points and at opposite sides of the plane of the gates, piston-actuated means for alternately closing the inlet-port valves, springs for opening said valves, piston-actuated means for alternately closing the exhaust-port valves, springs for opening said valves, piston-actuated means for alternately opening the gates, and means for closing said gates.

8. A rotary engine, comprising a cylinder having a circular chamber, a shaft centrally of and surrounded by said chamber, a piston rigid with the shaft and partitioning the chamber, diametrically opposite gates, valve-controlled inlet-ports communicating with the chamber at diametrically opposite points and at opposite sides of the plane of the gates, valve-controlled exhaust-ports communicating with the chamber at diametrically opposite points and at opposite sides of the plane of the gates, independent means holding the valves yieldingly open, a cam rotatable with the shaft, means caused by said cam to alternately close the inlet-port valves, a second cam rotatable with the shaft, means caused by said cam to alternately close the exhaust-port valves, means for alternately opening the gates, and means for closing said gates.

9. A rotary engine, comprising a cylinder having a circular chamber, a shaft centrally of and surrounded by said chamber, a piston rigid with the shaft and partitioning the chamber, a valve-controlled exhaust-port communicating with the chamber, an adjustable cam journaled on the shaft, a sliding sleeve mounted on the sleeve, a lever suitably supported and connected to slide the sliding sleeve, means whereby movement of the sliding sleeve shall rotate the adjustable cam, means for locking the cam at the desired point of adjustment, and means whereby said cam under the revolution of the shaft shall operate said valve.

10. In a rotary engine, a cylinder, comprising two members secured together and provided with mating circular grooves conjointly forming a circular passage, a shaft journaled in the cylinder centrally of the circular chamber, a disk secured rigidly on the shaft between the members of and within the cylinder, and provided with a peripheral recess, a bolt secured in said disk and having its head snugly engaging said recess to form a part of the disk, means to prevent said bolt from turning, a piston secured rigidly to said bolt and projecting outwardly from said head and partitioning the cylinder-chamber, and friction-rings carried by said piston and engaging the walls of said chamber.

11. In a rotary engine, a cylinder having a circular chamber and an intersecting shallow gate-passage, and a gate comprising a pair of members suitably pivoted and adapted to partition said chamber by swinging inwardly until they meet and to leave said chamber unobstructed by swinging outwardly; each member of the gate being provided at its inner or free end with an extension of half its thickness adapted to overlap each other, and one of the members having a groove in its inner edge and the other a tongue to engage said groove when the members are swung together to conjointly partition the cylinder-chamber.

12. A rotary engine, comprising a cylinder having a circular chamber, a shaft centrally of and surrounded by said chamber, a piston rigid with the shaft and partitioning the chamber, diametrically opposite gates, valve-controlled inlet-ports communicating with the chamber at diametrically opposite points and at opposite sides of the plane of the gates, valve-controlled exhaust-ports communicating with the chamber at diametrically opposite points and at opposite sides of the plane of the gates, independent means holding the valves yieldingly closed, a cam rotatable with the shaft, means caused by said cam to alternately open the inlet-port valves, a second cam rotatable with the shaft, means caused by said cam to alternately open the exhaust-port valves, a third cam rotatable with the shaft, means actuated by said cam to alternately open the gates, and means for closing said gates.

13. In a rotary engine, a circular chamber, a shaft centrally of and surrounded by said chamber, a piston rigid with the shaft and partitioning the chamber, diametrically opposite gates, inlet-ports communicating with the chamber at diametrically opposite points and at opposite sides of the plane of said gates, exhaust-ports communicating with said chamber at diametrically opposite points and at opposite sides of the plane of said gates, rotary valves for all of said ports, helical springs to hold said valves normally open, means for alternately closing the inlet-ports, means for alternately closing the exhaust-ports, means for alternately opening the gates, and means for alternately closing them.

14. In a rotary engine, a circular chamber, a shaft centrally of and surrounded by said chamber, a piston rigid with the shaft and partitioning the chamber, diametrically opposite gates, inlet-ports communicating with the chamber at diametrically opposite points and at opposite sides of the plane of said gates, exhaust-ports communicating with said chamber at diametrically opposite points and at opposite sides of the plane of said gates, conical rotary valves, yielding means to resist endwise movement of said valves, means to overcome such resistance and adjust and secure said valves in their new positions to compensate for wear and prevent leakage of steam around them, means for alternately closing the inlet-port valves, means for alternately closing the exhaust-port valves, means for alternately opening the gates, and means for alternately closing them.

15. In a rotary engine, a cylinder having a circular chamber, a shaft centrally of and surrounded by said chamber, a piston rigid with the shaft and partitioning the chamber, a valve-controlled exhaust-port communicating with the chamber, an adjustable cam journaled on the shaft, a sliding sleeve mounted on the shaft and provided with a spiral slot, a rotatable sleeve on the shaft and secured to the adjustable cam and provided with a pin engaging the spiral slot of the sliding sleeve, a lever suitably supported and connected to slide the sliding sleeve, means for locking the adjustable cam at the desired point, and means whereby said cam under the revolution of the shaft shall operate said valve.

In testimony whereof I affix my signature in the presence of two witnesses.

ALBERT O. ENGLUND.

Witnesses:
H. C. RODGERS,
G. Y. THORPE.